United States Patent
Turner et al.

(10) Patent No.: US 9,169,936 B2
(45) Date of Patent: Oct. 27, 2015

(54) SAFETY ANTI-REVERSING DEVICE FOR A BOTTOM OF A BASIN

(71) Applicant: NORHAM, Saint-Donat-sur-l'Herbasse (FR)

(72) Inventors: David Turner, Marsaz (FR); Francois Michel, Saint Donat (FR); Mikael Lamberton, Arthemonay (FR); Sebastien Pally, Romans (FR)

(73) Assignee: NORHAM, Saint-Donat-sur-l'herbasse (FR)

( * ) Notice: Subject to any disclaimer, the term of this patent is extended or adjusted under 35 U.S.C. 154(b) by 244 days.

(21) Appl. No.: 13/939,901

(22) Filed: Jul. 11, 2013

(65) Prior Publication Data
US 2014/0014203 A1 Jan. 16, 2014

(30) Foreign Application Priority Data

Jul. 16, 2012 (FR) ..................... 12 02014

(51) Int. Cl.
*F16K 15/02* (2006.01)
*E02D 31/12* (2006.01)
*F16K 15/14* (2006.01)

(52) U.S. Cl.
CPC .............. *F16K 15/026* (2013.01); *E02D 31/12* (2013.01); *F16K 15/145* (2013.01); *Y10T 137/7837* (2015.04)

(58) Field of Classification Search
CPC ... F16K 15/026; F16K 15/145; F16K 15/031; E02D 31/12; Y10T 137/7837

USPC ............ 137/362, 512.15, 844, 846, 852, 855, 137/859; 4/507; 222/492; 52/302.3, 302.7
See application file for complete search history.

(56) References Cited

U.S. PATENT DOCUMENTS

| | | | | |
|---|---|---|---|---|
| 2,974,835 | A * | 3/1961 | Herbrick | 222/507 |
| 3,623,504 | A * | 11/1971 | Davis | 137/852 |
| 6,547,108 | B2 * | 4/2003 | Johanson | 222/387 |
| 6,810,537 | B1 * | 11/2004 | Barnes et al. | 4/507 |
| 7,306,129 | B2 * | 12/2007 | Swiss et al. | 222/494 |

FOREIGN PATENT DOCUMENTS

| | | |
|---|---|---|
| DE | 181 860 C | 2/1905 |
| DE | 100 44 823 C1 | 2/2002 |
| FR | 2 056 253 | 5/1971 |
| FR | 2 919 037 | 1/2009 |

* cited by examiner

*Primary Examiner* — Craig Schneider
*Assistant Examiner* — Nicole Wentlandt
(74) *Attorney, Agent, or Firm* — Oliff PLC

(57) ABSTRACT

Able to prevent a leakage flow from a basin in a ground and to enable a filling flow from this ground, a safety anti-reversing device comprises a body comprising communicating openings for passage of the filling flow. Supported by this body, a flexible membrane comprises an annular shutter and a closing portion. The annular shutter is offset with respect to the communicating openings and swivels between a closed down position in which this annular shutter is applied in tight manner on the body, and an open position in which the annular shutter is away from the body. Distinct from the annular shutter, the closing portion covers the communicating openings so as to be able to hermetically close these communicating openings.

11 Claims, 3 Drawing Sheets

SAFETY ANTI-REVERSING DEVICE FOR A BOTTOM OF A BASIN

BACKGROUND OF THE INVENTION

The invention relates to the field of basins dug out in the ground. More precisely, the invention relates to a safety anti-reversing device for a bottom of a basin in a ground that is able to be the seat of hydrostatic pressures liable to exert a thrust on this bottom. Being able to prevent a leakage flow in a first direction, from the basin to the ground, and to enable a filling flow in a second direction contrary to the first direction, the type of safety anti-reversing device in question comprises:

- a body comprising communicating openings for passage of the filling flow, and
- a flexible membrane supported by the body and deformable, due to the thrust force of a hydrostatic pressure in the ground, from a closed configuration in which this flexible membrane closes said openings in tight manner so as to prevent leakage flow, to a pass-through configuration in which the filling flow is enabled passing through the body via the communicating openings.

STATE OF THE ART

Numerous basins dug in the ground are designed to retain water which may be clean or charged with various elements. Such basins include among others swimming pools, water retention reservoirs and sewage treatment plants. Depending on its function, a basin may sometimes have a very extensive bottom which may comprise a concrete slab extended upwards by side walls.

The ground surrounding a basin can be the seat of large hydrostatic pressures, which may for example result from water rising up from underlying water tables. So long as the basin is full, the hydrostatic pressure due to the water present inside the basin counteracts the possible hydrostatic pressures prevailing in the ground. This is not the case when, for one reason or another, the basin is emptied. This is why the bottom of a temporarily emptied basin may break or be damaged in some other manner. The damage caused under such circumstances is all the more harmful as it may result in considerable repair costs, and sometimes in the basin being unable to be used until the repairs have been performed.

To attempt to counteract the risk of the bottom of a basin being damaged by hydrostatic pressures in the surrounding ground, safety anti-reversing devices of the above-mentioned type have been imagined, these devices being fitted in front of the passages arranged in the bottom of the basin to be protected. French Patent FR 2 919 037 proposes a safety anti-reversing device of the above-mentioned type which is able to prevent a leakage flow from the basin to the ground, while at the same time enabling a filling flow of the basin in the opposite direction, in particular when the basin has been emptied of its content and the hydrostatic pressures prevail in the ground around this basin.

More often than not, the water entering the basin from the ground via a safety anti-reversing device brings solid particles with it. If, when the level of the water table has dropped down again, such solid particles may have been trapped in the safety anti-reversing device so as to be detrimental to its tightness, an operation involving maintenance personnel for the purposes of removing these solid particles has to be scheduled and carried out before the basin is able to be refilled, which is constraining and costly. To be really satisfactory, a safety anti-reversing device has to have a robust operation on account of the risk of its tightness against a leakage flow being rendered imperfect, in particular by solid particles having been conveyed by a filling flow. In this respect, the safety anti-reversing device described in the above-mentioned French Patent FR 2 919 037 presents a progress compared with a discharge valve proposed in French Patent FR 2 056 253.

A water rise from an underlying water table can occur very quickly. When this is the case, filling of the basin by the safety anti-reversing devices equipping the bottom of this basin also has to be fast, for if this is not the case, this filling may be powerless to oppose damage to the bottom of the basin.

When it is dimensioned so as to be able to oppose a leakage flow to the ground in reliable manner, a safety anti-reversing device of given design can only let a certain water flow pass in the filling direction of a basin, for a given driving pressure in this filling direction. This water flow rate determines the minimum number of safety anti-reversing devices to be installed per surface unit on a bottom of a basin for this basin bottom to be suitably protected in case of a rapid rise of the level of the water in the ground surrounding the basin. On account of the cost of a safety anti-reversing device and of its installation cost, it is desirable to be able to reduce the minimum number of safety anti-reversing devices to be installed per surface unit on a bottom of a basin, i.e. the minimum density of safety anti-reversing devices to be provided on the bottom of the basin for this bottom to be suitably protected.

Being able to oppose a leakage flow to the ground in reliable manner and being able to let a large water flowrate pass in the filling direction of the basin, for a given difference of driving pressure in this direction, constitute two opposing constraints which a safety anti-reversing device has to be able to satisfy simultaneously to be able to reduce the minimum density of safety anti-reversing devices to be provided for a bottom of a basin to be suitably protected.

SUMMARY OF THE INVENTION

At least one object of the invention is to enable a reduction of the minimum density of safety anti-reversing devices to be provided for a bottom of a basin to be suitably protected.

According to the invention, this object is achieved by means of an anti-reversing device which is of the above-mentioned type and which comprises:

- an annular shutter offset with respect to the communicating openings and swivelling between a closed-off position in which this annular shutter of the flexible membrane in its sealed-off configuration is applied in tight manner on the body, and an open position in which the annular shutter of the flexible membrane in its pass-through configuration is away from the body, and
- a closing portion that does not swivel with respect to the body, distinct from the annular shutter and covering the communicating openings so as to be able to hermetically close these communicating openings, in the sealed-off configuration, and to be moved away from the communicating openings by the thrust force of the hydrostatic pressure in the pass-through configuration.

The closing portion and the annular shutter form part of the same wall under which the filling flow can pass from the communicating openings to the level of a free edge of the annular shutter, when the flexible membrane is in its pass-through configuration.

The safety anti-reversing device as defined above can be such that it can oppose a leakage flow to the ground in reliable manner, it at the same time being important that a large water flow is able to pass in the filling direction of a basin, for a given difference of driving pressure in this direction.

An anti-reversing device as defined in the foregoing can incorporate one or more other advantageous features, either alone or in combination, in particular among those defined in the following.

Advantageously, the body comprises:
a mounting flange,
a central portion salient with respect to the mounting flange, and
an annular wall connecting the mounting flange to the central portion, communicating openings being drilled in this annular wall which is surrounded by the closing portion constituting the flexible membrane.

Advantageously, the closing portion is flexibly clamped onto the annular wall of the body.

Advantageously, at the level of the closing portion, the flexible membrane comprises a succession of annular ribs for flexible biasing of this closing portion towards the annular wall of the body.

Advantageously, the annular shutter is located at the level of the central portion of the body so as to extend in front of this central portion when this annular shutter is down in the sealing position.

Advantageously, the flexible membrane comprises an annular securing portion which at least partially covers a rear surface of the mounting flange so as to be clamped between this mounting flange and the bottom of the basin when the safety anti-reversing device is fixed to this bottom.

Advantageously, the annular shutter has a flexible stiffness resulting in flexible biasing by itself to its sealing position. The annular shutter preferably comprises a succession of angularly offset grooves for reducing the flexible stiffness in elongation in a direction parallel to the free edge of the annular shutter.

Advantageously, between the closing portion and the annular shutter, the flexible membrane comprises a portion of great flexibility defining an annular hinge around which the annular shutter is swivel-mounted.

Advantageously, at the level of the hinge, the flexible membrane comprises at least one thinned area to enhance the flexibility of the hinge. This thinned area extends along the same closed curve as the hinge.

Advantageously, downstream from the communicating openings, in the second direction, the body delineates a hollow forming at least a part of a cavity for removal of the filling flow to the annular shutter. This cavity is delineated by the body and the flexible membrane.

Advantageously, the annular shutter is provided with at least one annular sealing lip that is applied in tight manner on the body when the annular shutter is in its sealed position. This annular sealing lip runs along a free edge of the annular shutter.

BRIEF DESCRIPTION OF THE DRAWINGS

Other advantages and features will become more clearly apparent from the following description of a particular embodiment of the invention given for non-restrictive example purposes only and represented in the appended drawings, among which.

DESCRIPTION OF A PREFERRED
EMBODIMENT OF THE INVENTION

Figure 1:
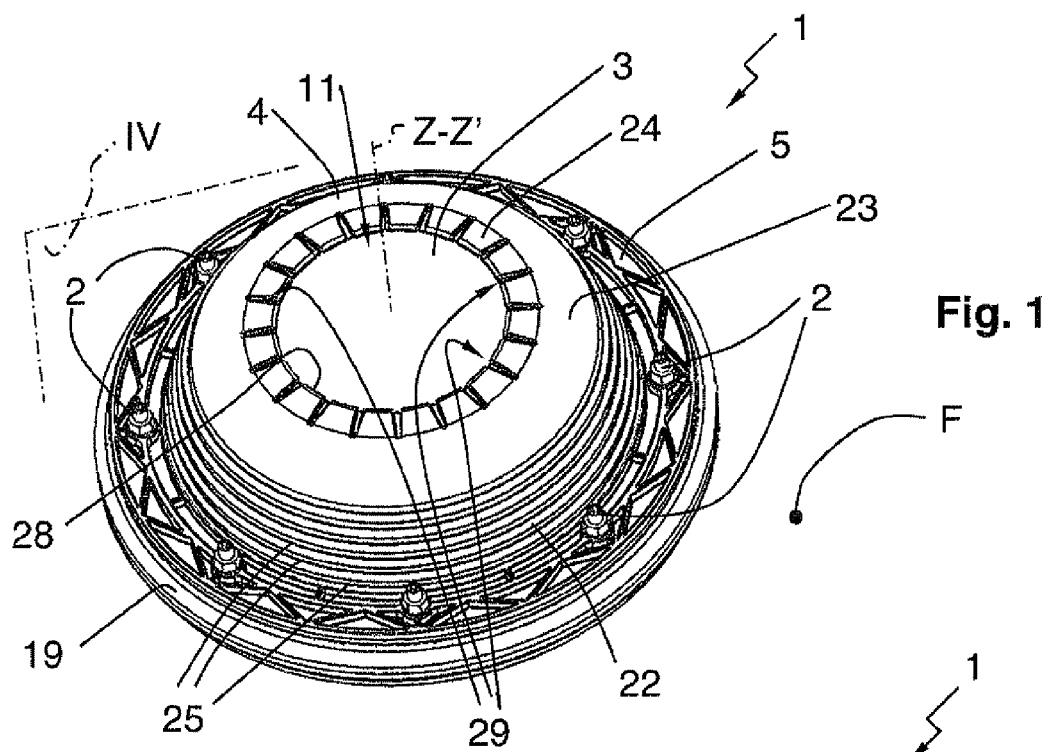
FIG. 1 is a perspective view of a safety anti-reversing device according to the invention.

In FIG. 1, a safety anti-reversing device 1 according to the invention is fixed by means of a set of clamping screws 2 against the bottom F of a basin hollowed out in the ground. For example purposes, this basin can be a swimming pool, a water retention reservoir or a sewage treatment plant basin.

Figure 2:
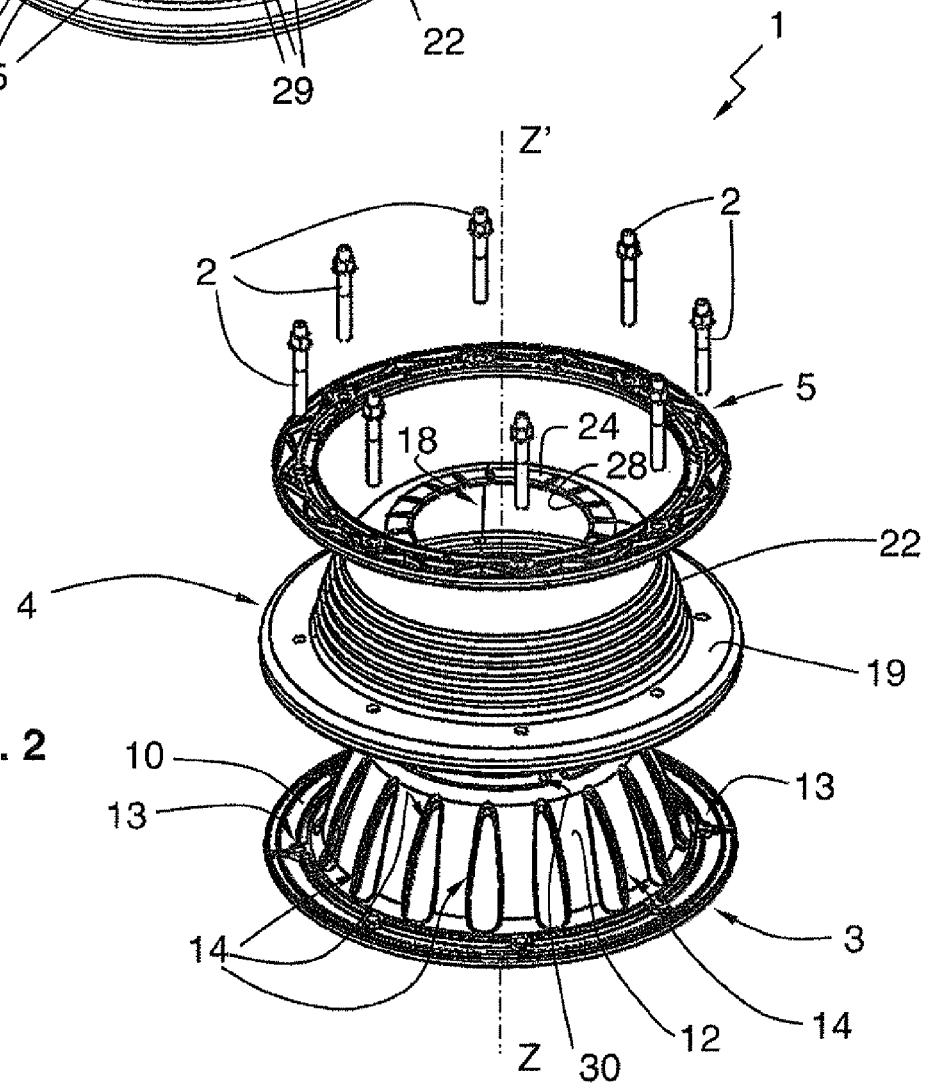
FIG. 2 is an exploded perspective view of the safety anti-reversing device represented in FIG. 1.

As can be seen in FIG. 2, safety anti-reversing device 1 is an assembly of several elements comprising a rigid body 3 and a flexible membrane 4 fitted on this body 3 and flexibly deformable. Body 3 and flexible membrane 4 each extend globally according to a surface of revolution of axis Z-Z'. They form a sub-assembly which a clamping ring 5 is designed to secure and to clamp against the bottom F, itself being clamped towards this bottom F by screws 2.

Body 3 comprises an annular base or mounting flange 10 and a central portion 11 (visible in FIG. 1), which are offset from one another in the direction of the axis Z-Z' and connected to one another by an annular wall 12. Holes 13 are drilled in mounting flange 10 for passage of screws 2. Annular wall 12 and central portion 11 together constitute a shape similar to a dome extending upwards from mounting flange 10. This dome is watertight except at the level of a succession of communicating openings 14 which pass through annular wall 12 from side to side. Angularly offset from one another around the axis of revolution Z-Z', openings 14 are oblong so as to extend over the major part of the width of annular wall 12.

Body 3 is moulded from a rigid material which is preferably resistant to chemical aggressions. This rigid material is preferably an injected plastic material, for example a polyamide (PA) or a polymer of the polyester family. Body 3 is preferably moulded from polypropylene (PP) by injection.

Figure 3:
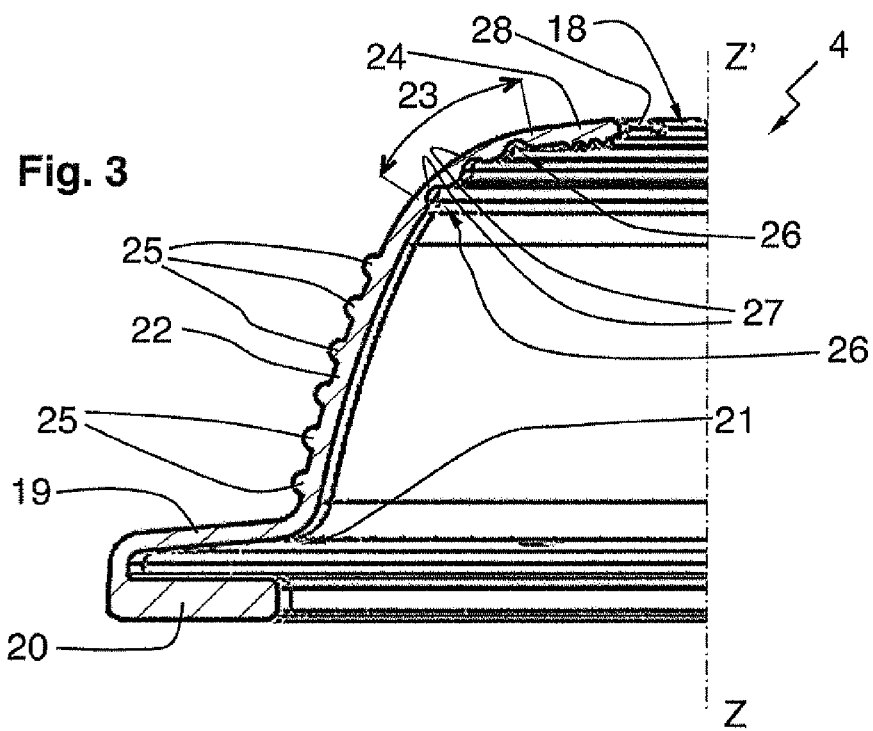
FIG. 3 is an axial cross-sectional view representing a half of a flexible membrane constituting the safety anti-reversing device of FIGS. 1 and 2.

As can be clearly seen in FIG. 3, flexible membrane 4 is designed to cover and to snugly follow the outer surface of body 3. It has a general shape that is globally similar to this outer surface except that a central passage 18 centred on the axis of revolution Z-Z' is drilled therein.

Flexible membrane 4 comprises a hollow securing crown 19 which is designed to clip onto mounting flange 10 and delineates for this purpose an annular groove 21 accommodating this mounting flange 10. The rear portion of hollow securing crown 19 is more precisely an annular securing portion 20 designed to be clamped by mounting flange 10 onto a bottom of a basin.

In the present text and in the appended claims, the terms "rear" and "front" consider the safety anti-reversing device as seen from the basin, once it has been fitted in place. For example, the front surface of safety anti-reversing device 1 is the surface that can be seen from the inside of a basin having a bottom equipped with this safety anti-reversing device 1. Again in the sense in which the terms "rear" and "front" are understood, the rear surface of safety anti-reversing device 1 is that which is designed to be facing in the direction of a passage drilled in the bottom of a basin.

A closing portion 22 of the communicating openings 14 connects hollow securing crown 19 to a hinge 23, which itself connects this closing portion 22 to a swivelling annular shutter 24.

Closing portion 22 can expand in flexible manner, perpendicularly to the axis of revolution Z-Z', without swivelling with respect to body 3. At the level of its outer surface, closing portion 22 bears a succession of flexible annular ribs 25 which have the function of biasing it in centripetal manner towards body 3 and of clamping it on body 3.

Like annular shutter 24, hinge 23 extends circularly in the form of a curve closed on itself, perpendicularly to which it has a width. As movement takes place progressively from closing portion 22 moving in the direction of annular shutter 24, hinge 23 is progressively inflected in the direction of central passage 18. At the level of hinge 23, several circular grooves 26 are arranged in the rear surface of flexible membrane 4. A thinned area 27 designed to enhance the flexibility of hinge 23 corresponds to each circular groove 26. Thinned areas 27 are separated from one another by the width of hinge 23. Hinge 23 is a portion of great flexibility around which annular shutter 24 can swivel.

Annular shutter 24 comprises a single expansible free edge 28 closed on itself, which surrounds and delineates central passage 18. Annular shutter 24 swivels frontwards around hinge 23 opening into a corolla, in flexible manner, which results in an expansion of its free edge 28 and an enlargement of the cross-section of central passage 18. Radial grooves 29 angularly offset from one another around the axis of revolution Z-Z' are arranged in the front surface or the outer surface of annular shutter 24 and facilitate opening of the latter by reducing its elastic stiffness in the direction parallel to free edge 28.

Flexible membrane 4 is preferably moulded from terpolymer of Ethylene-propylene-diene monomer (EPDM). Flexible membrane 4 can also be made from another elastomer either made from thermoplastic or from any other suitable material. Preferably, the material constituting flexible membrane 4 complies with European Standard EN 681-1 (class WC). It can for example have a Shore A hardness of about 40 Sh A.

Figure 4:
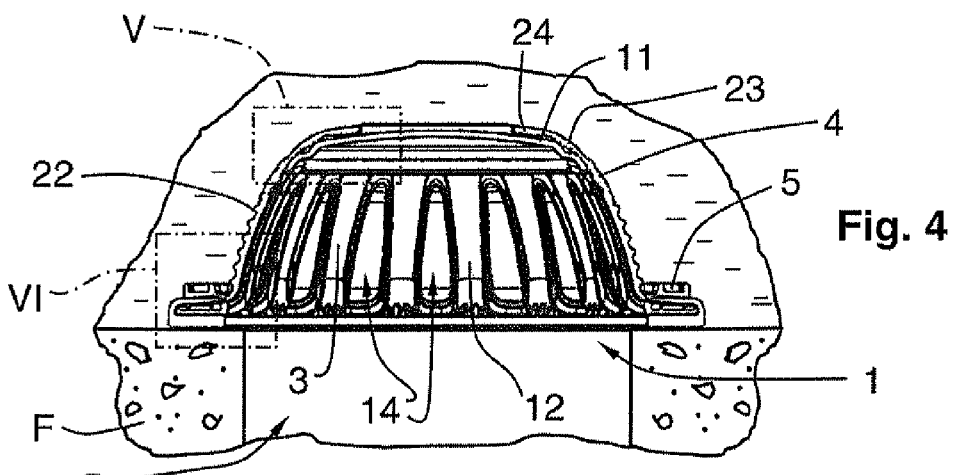
FIG. 4 is a cross-sectional view along the plane IV of FIG. 1 and represents the safety anti-reversing device of FIGS. 1 and 2, and also a portion of a basin having a bottom equipped with this safety anti-reversing device, the flexible membrane of which is in a closed configuration preventing a leakage flow from the basin.

In FIG. 4, flexible membrane 4 is mounted on body 3. Closing portion 22 covers annular wall 12 and communicating openings 14, which it closes in tight manner. Hinge 23 covers the inflection area where the junction of annular wall 12 and of central portion 11 to one another is made. Annular shutter 24 is thus offset with respect to communicating openings 14, being located at the level of central portion 11 of body 3.

Figure 5:
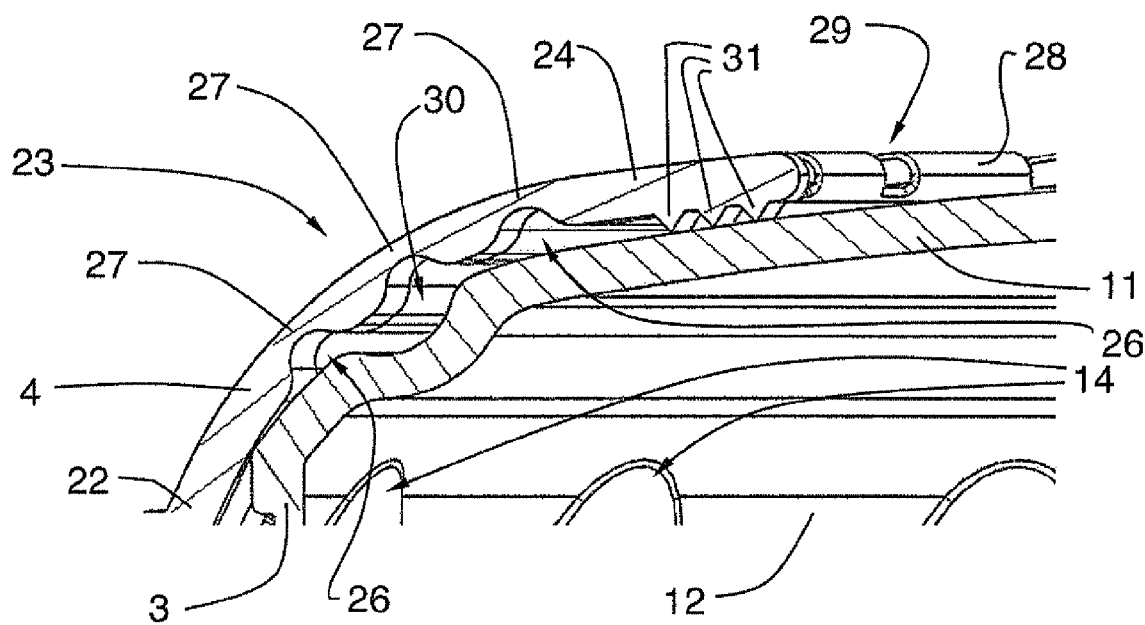
FIG. 5 is a detailed view resulting from an enlargement of the window noted V in FIG. 4.

As can be clearly seen in FIG. 5, front surface of body 3 delineates a hollow in the form of an annular groove 30, located at the junction of annular wall 12 and of central portion 11, underneath hinge 23. Discontinuous in the represented example, this groove 30 forms all or part of a cavity which flexible membrane 4 also delineates and which is designed to receive water coming from communicating openings 14 and flowing to central passage 18.

Again in FIG. 5, it can be seen that, on the side where its rear surface or inner surface is located, annular shutter 24 is provided with several annular sealing lips 31 pressing in tight manner on body 3 when annular shutter 24 is in its shut down position, i.e. in its position in FIG. 5. Preferably three in number as in the represented example, annular sealing lips 31 surround central passage 18 and run along free edge 28.

Figure 6:
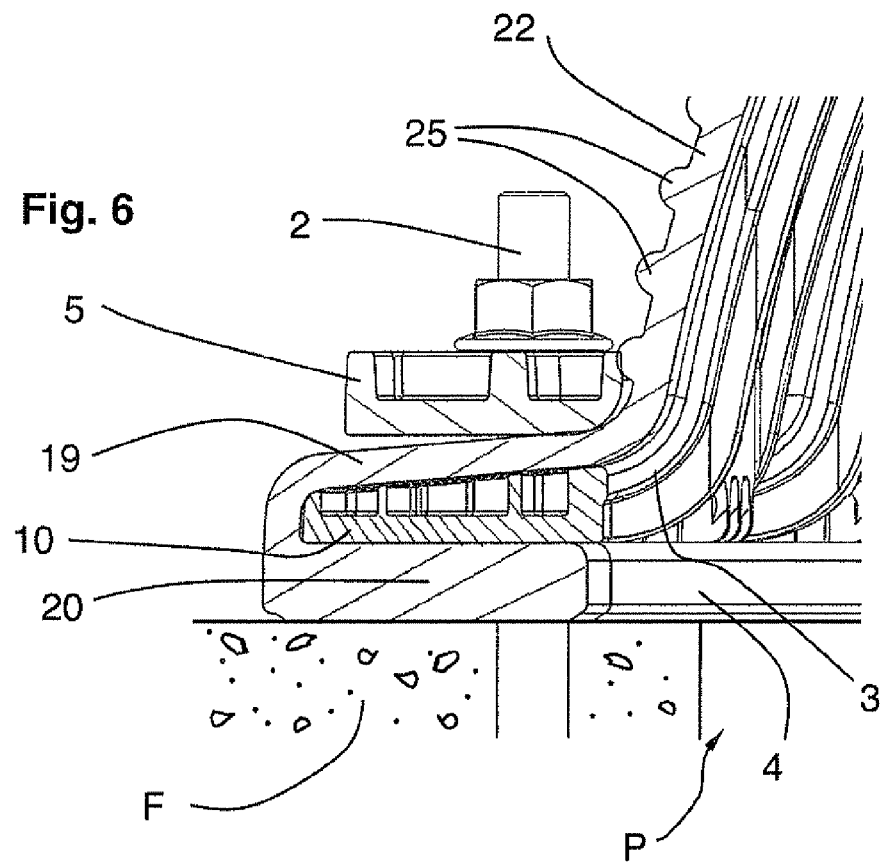
FIG. 6 is a detailed view resulting from an enlargement of the window noted VI in FIG. 4.

In FIG. 4, safety anti-reversing device 1 is fixed in front of a passage P so as to close the latter. Passage P is drilled in bottom F, down to the ground, not visible, in which the basin is dug out. As can be seen in FIG. 6, clamping of annular securing portion 20 between mounting flange 10 and bottom F of the basin is performed along with clamping of the front portion of hollow securing crown 19 between clamping ring 5 and mounting flange 10. These two clampings participate in securing flexible membrane 4 in place. Annular securing portion 20 further provides tightness between safety anti-reversing device 1 and the bottom F of the basin.

Still in FIG. 4, the basin contains water having a mass that gives rise to a hydrostatic pressure applied on the front surface of flexible membrane 4. Due to its own centripetal clamping force, closing portion 22 is pressed against body 3 and hermetically closes communicating openings 14. The hydrostatic pressure inside the basin also acts in the direction of closing of communicating openings 14 by flexible membrane 4. In parallel, this same hydrostatic pressure generated in the basin presses annular shutter 24 against body 3, in a closed down position, in which annular sealing lips 31 are applied in tight manner on central portion 11 of this body 3. Flexible membrane 4 is then in a closed configuration and prevents any leakage flow through safety anti-reversing device 1 from the basin to the ground. In this closed configuration, an annular tightness at the level of lips 31 is added to tight closing of communicating openings 14. This tight closing is achieved by closing portion 22, i.e. by a non-swivelling portion of flexible membrane 4, and it is very stable.

Figure 7:
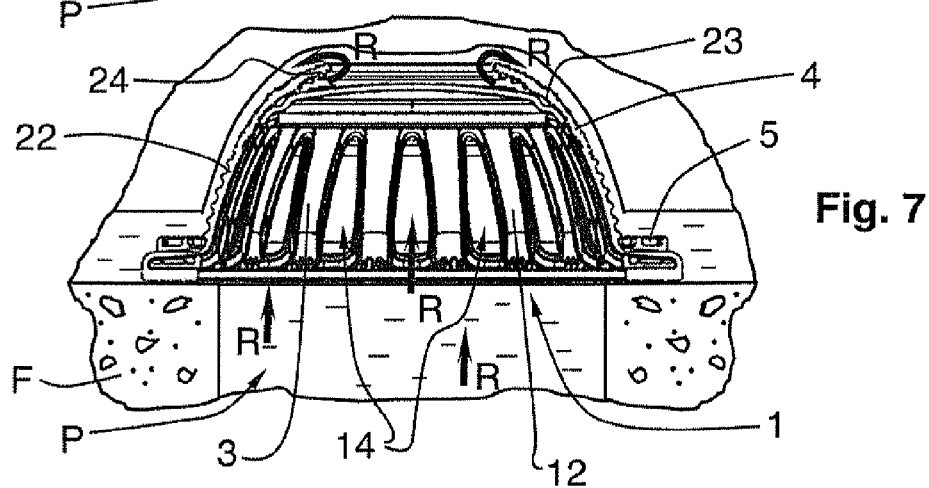
FIG. 7 is a cross-sectional view which is similar to FIG. 4 and in which the flexible membrane of the safety anti-reversing device of FIGS. 1 and 2 is in a pass-through configuration and enables a filling flow to the basin, from the ground, due to the effect of a hydrostatic pressure in this ground.

In FIG. 7, a hydrostatic pressure is exerted in the ground surrounding the basin which has previously been emptied. This hydrostatic pressure has repelled closing portion 22 away from annular wall 12 and from communicating openings 14, which are therefore open. Water coming from the ground passes through body 3, via open communicating openings 14. This water is then collected by the cavity formed by groove 30, from which it is then removed to annular shutter 24. The cavity comprising groove 30 serves the purpose of annular distribution of the water flow. The thrust exerted by this water flow keeps annular shutter 24 swivelled away from body 3. A filling flow R of the basin is thus originated in the ground, flows via passage P and passes through safety anti-reversing device 1, before ending up in the basin. Flexible membrane 4 is then in a pass-through configuration enabling filling flow R.

From communicating openings 14 up to central passage 18, filling flow R passes between body 3 and flexible membrane 4, in an annular passage. When flexible membrane 4 is in its pass-through configuration, swivelling of annular shutter 24 away from body 3 facilitates passage of a large water flow. It also facilitates removal of solid particles which may be conveyed along with the water by filling flow R. The same is the case for the cavity comprising groove 30.

The cavity comprising groove 30 further facilitates instauration of filling flow R and, when this instauration takes place, releases annular shutter 24 to move the latter away from body 3.

The invention claimed is:

1. A safety anti-reversing device for a bottom of a basin in a ground, the safety anti-reversing device comprising:
   a body comprising communicating openings for passage of a liquid, and
   a flexible membrane supported by the body and deformable, from a closed configuration in which the flexible membrane closes said communicating openings in tight manner so as to prevent leakage flow from the basin to the ground, to a pass-through configuration in which a filling flow of the liquid toward the basin is enabled passing through the body via the communicating openings, wherein the flexible membrane comprises:

an annular shutter offset with respect to the communicating openings and swivelling between a closed-off position in which the annular shutter is applied in tight manner on the body, and an open position in which the annular shutter is away from the body, the closed-off position of the annular shutter corresponding to the sealed-off configuration of the flexible membrane, and the open position corresponding to the pass-through configuration of the flexible membrane, and a closing portion that does not swivel with respect to the body, distinct from the annular shutter and covering the communicating openings so as to be able to hermetically close the communicating openings, in the sealed-off configuration, and to be moved away from the communicating openings by a thrust force of the liquid from the ground to the basin in the pass-through configuration, the closing portion and the annular shutter forming part of a same wall under which the filling flow of the liquid can pass from the communicating openings to a level of a free edge of the annular shutter, when the flexible membrane is in the pass-through configuration, at the level of the closing portion, the flexible membrane comprises a succession of annular ribs for flexible biasing the closing portion towards an annular wall of the body, between the closing portion and the annular shutter, the flexible membrane comprises a portion of greater flexibility defining an annular hinge around which the annular shutter is swivel-mounted, and at the level of the annular hinge, the flexible membrane comprises circular grooves that define at least one thinned area to enhance the flexibility of the annular hinge, the thinned area extending along the same closed curve as the annular hinge.

2. The safety anti-reversing device according to claim 1, wherein the body comprises:

a mounting flange, a central portion salient with respect to the mounting flange, and the annular wall connecting the mounting flange to the central portion, communicating openings being drilled in this annular wall which is surrounded by the closing portion constituting the flexible membrane.

3. The safety anti-reversing device according to claim 2, wherein the closing portion is flexibly clamped onto the annular wall of the body.

4. The safety anti-reversing device according to claim 2, wherein the annular shutter is located at the level of the central portion of the body so as to extend in front of this central portion when this annular shutter is down in its sealing position.

5. The safety anti-reversing device according to claim 2, wherein the flexible membrane comprises an annular securing portion which at least partially covers a rear surface of the mounting flange so as to be clamped between the mounting flange and the bottom of the basin when the safety anti-reversing device is fixed to this bottom.

6. The safety anti-reversing device according to claim 1, wherein the annular shutter has a flexible stiffness resulting in flexible biasing by itself to its sealing position, the annular shutter comprising a succession of angularly offset grooves for reducing the flexible stiffness in a direction parallel to the free edge of the annular shutter.

7. The safety anti-reversing device according to claim 1, wherein, downstream from the communicating openings, from the ground to the basin, the body delineates a groove forming at least a part of a cavity for removal of a filling flow to the annular shutter, the cavity being delineated by the body and the flexible membrane.

8. The safety anti-reversing device according to claim 1, wherein the annular shutter is provided with at least one annular sealing lip that is applied in tight manner on the body when the annular shutter is in its sealed position, the annular sealing lip running along a free edge of the annular shutter.

9. The safety anti-reversing device according to claim 2, wherein the annular wall and the central portion form a zone of inflection at a point whether they join.

10. The safety anti-reversing device according to claim 1, wherein a front surface of the body defines a trough-shaped annular groove, the trough-shaped annular groove forming all or part of a cavity also bounded by the flexible membrane.

11. The safety anti-reversing device according to claim 1, wherein the body has a bowl shape.

* * * * *